B. EGLOFF.
ILLUMINATING-DEVICES FOR CHRISTMAS TREES, &c.

No. 194,421. Patented Aug. 21, 1877.

Witnesses:
Henry Eichling
H. Wells Jr

Inventor:
Bathis Egloff
per James A. Whitney
Atty.

UNITED STATES PATENT OFFICE.

BATHIS EGLOFF, OF STATEN ISLAND, ASSIGNOR TO ANTON WEIDMANN AND CHRISTIAN L. SCHWARZ, OF NEW YORK, N. Y.

IMPROVEMENT IN ILLUMINATING DEVICES FOR CHRISTMAS-TREES, &c.

Specification forming part of Letters Patent No. 194,421, dated August 21, 1877; application filed June 12, 1877.

*To all whom it may concern:*

Be it known that I, BATHIS EGLOFF, of Staten Island, in the county of Richmond and State of New York, have invented certain Improvements in Illuminating Devices for Christmas-Trees, &c.; and that the following is a full, clear, and exact description of the same.

My invention relates to an illuminating device which is intended more particularly for application to Christmas-trees, but is applicable to other purposes.

The object of my invention is to supersede the ordinary candle by a device which will serve the double purpose of illumination and ornamentation, and avoid the disadvantages consequent upon the use of the ordinary candle.

The improvements will be fully hereinafter described, and pointed out in the claim.

Figure 1:
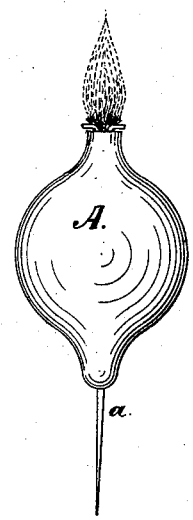
Figure 2:
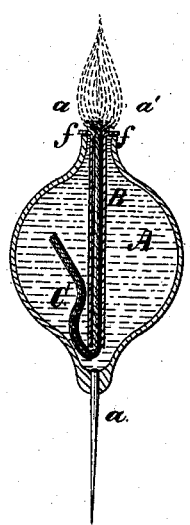
Figure 3:
Figure 4:
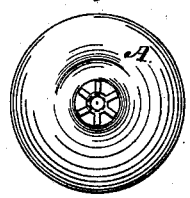
Figure 5:
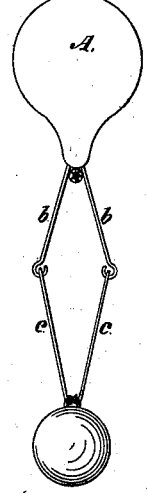

In the accompanying drawing, Figure 1 is a side view of a vessel embodying my improvements. Fig. 2 is a vertical section of the same. Fig. 3 is a side view of the wick-tube. Fig. 4 is a top view of the vessel with the wick-tube in place. Fig. 5 is a side view of a modification of the invention.

The vessel A is here shown as of spheroidal form; but it may be of any other suitable shape. When desired, the vessel may be made of metal or other suitable material; but I prefer to make it of blown glass or other transparent substance. The vessel A is provided with means for attaching it to a Christmas-tree or other support, which means may consist of a pointed spur or pin, a, as shown in Figs. 1 and 2, or downwardly-extending hooks b, from which an apple, an ornamental ball, or other weight may be suspended by strings c, as illustrated in Fig. 5. The vessel A is provided with an opening, f, for the reception of the wick-tube B. On one side of the wick-tube is a longitudinal slot, g, which may extend for nearly or quite the entire length of the tube. At the upper end of the tube are laterally-extending lugs or projections a', which rest upon the edges of the opening f, and retain the wick-tube in place, and at the same time permit the passage of air inward through the spaces between the projections a'. The wick C passes up through the wick-tube B, and its lower end extends beyond the bottom of the wick-tube inside of the vessel A, as shown in Fig. 2.

The vessel A thus constructed is adapted to the holding of a suitable substance for illuminating purposes. I prefer to use a hydrocarbon or other suitable substance—paraffine, for example, which will remain solid at ordinary temperatures, but will melt at a temperature of, say, 95° Fahrenheit. When the vessel A is made of glass the paraffine or other substance may be made to partake of various colors by means of coloring material mixed with it; and thus, when used for illuminating a tree or for a similar purpose, the vessel serves all the purposes of the ordinary candle, and also of the ornamental glass balls commonly used, as the colored substance shows plainly through the transparent material of which the vessel is made.

In using this invention the vessel is attached to the bough of the tree or other support, either by inserting the point of the spur a therein, or by placing it thereon with the hooks b b on either side thereof. When the upper end of the wick C is ignited the heat from the flame, communicated to the wick-tube, melts the substance around its upper end, and allows it to pass through the slot g to the wick, and thereby slowly feed it with a steady supply, to insure continued combustion, but at the same time melts it so slightly that any danger of spilling the same from the vessel is entirely avoided.

By raising the wick-tube B the wick C may be adjusted to any suitable relation with the opening f of the vessel A and the substance contained in said vessel.

By the construction herein described an article is produced which possesses several advantages. It combines in itself the desired features of three articles necessary to the proper decoration of a Christmas-tree—namely, an ornamental glass ball, a bracket or candlestick, and a candle. It is economical, as there is no loss by dripping or by irregular burning resulting from currents of air or otherwise, and it avoids the possibility of injury to carpets resulting from the dripping of melted grease incident to the use of candles.

The vessel being filled with a substance which is always solid, except when the wick is ignited, it is well adapted for packing and transportation. After the contents of a vessel have been exhausted it can readily be refilled for further use.

I do not claim, broadly, a vessel for holding hydrocarbons, and adapted to be applied to the illumination of Christmas-trees. Neither do I claim, broadly, the use of hydrocarbon or other substance for such purpose.

What I claim as my invention, and desire to secure by Letters Patent, is—

In combination with the vessel A, constructed as described, the wick-tube B, provided with the projections $a'$ and the longitudinal slot $g$, substantially as and for the purpose set forth.

BATHIS EGLOFF.

Witnesses:
 EDWARD HOLLY,
 HENRY EICHLING.